Figure 1:
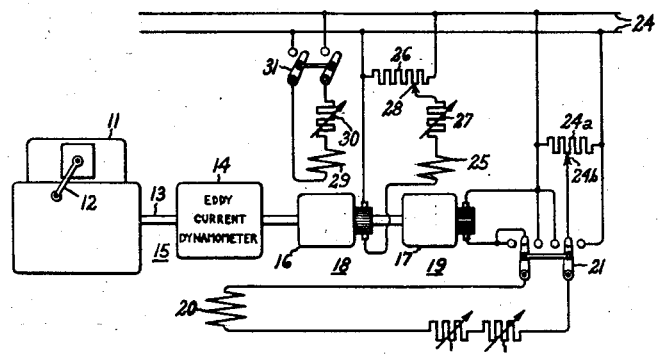

Dec. 7, 1943.          R. H. KAUFMANN          2,335,860
DYNAMOMETER EXCITATION CONTROL SYSTEM
Filed Sept. 4, 1940

Inventor:
Richard H. Kaufmann,
by Harry E. Dunham
His Attorney.

Patented Dec. 7, 1943

2,335,860

UNITED STATES PATENT OFFICE 2,335,860

DYNAMOMETER EXCITATION CONTROL SYSTEM

Richard H. Kaufmann, Schenectady, N. Y., assignor to General Electric Company, a corporation of New York Application September 4, 1940, Serial No. 355,321

11 Claims. (Cl. 73—51)

This invention relates to an electrical dynamometer and particularly to an electrical dynamometer which is adapted to impose a load of certain characteristics upon a power source such as an internal combustion engine.

It is an object of my invention to provide an improved dynamometer excitation control system.

It is another object of my invention to provide an excitation control system for a dynamometer employed for loading a mechanical power source whereby the actual operating characteristics of the power source may be duplicated by causing the power absorbing means to have a definite and predetermined relationship to its speed.

It is a further object of my invention to provide an improved dynamometer excitation control system in which the total dynamometer excitation is functionally related to the speed and which may have components which vary as the first or second power of the speed or assume intermediate values of total excitation between these two limits.

Other and further objects and advantages of my invention will become apparent as the description proceeds.

In order to simulate in the laboratory the conditions of actual service with various types of loads, for example, propellers driven by an internal combustion engine, it is desirable to provide and excitation system for a dynamometer employed in loading the prime mover or engine which automatically will maintain with varying loads the desired power-speed relationship. In carrying out my invention in its preferred form, a pair of direct current generators which are driven at a speed proportional to the dynamometer are adapted to be employed for exciting the dynamometer field. One of these exciters has its armature connected to the field of the dynamometer while its field is connected in circuit with the armature of the other exciter generator and with an adjustable source of voltage. The other exciter may be excited either from an adjustable voltage source of supply or by means of a permanent magnet, the former being the preferred arrangement on account of flexibility and the ability to avoid excessive voltages. The exciter whose armature is connected for energizing the dynamometer field is operated preferably in the unsaturated condition. By adjusting the relative magnitude of the adjustable and variable components of excitation supplied to the field of the exciter which supplies the dynamometer field, the horsepower absorption of the dynamometer as a function of speed may be made to vary automatically over a wide range. Further, by providing suitable switching means the dynamometer may be supplied with excitation independent of variations in speed.

In a modification, the output of the exciter, which in the foregoing arrangement is connected directly to the dynamometer field, is connected to the input of a dynamo-electric amplifier instead of being directly connected to the dynamometer field. With such an arrangement smaller exciters may be employed thereby making it unnecessary to cradle them with the main dynamometer.

Figure 2:
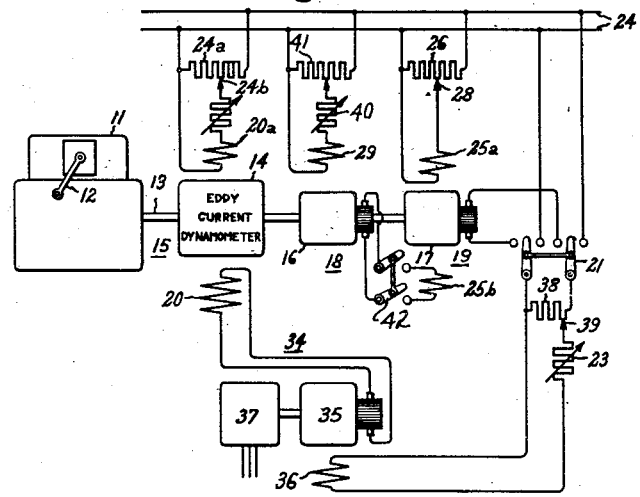
Figure 3:
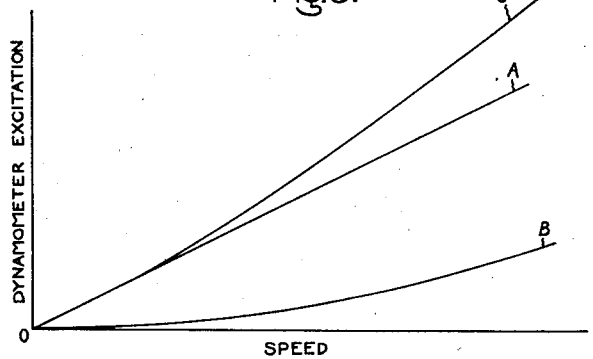

The novel features which are characteristic of my invention are set forth with particularity in the appended claims. My invention, however, both as to its organization and its method of operation will be better understood with reference to the following description when considered in connection with the accompanying drawing in which Fig. 1 is a schematic electric circuit diagram of apparatus arranged in accordance with my invention; Fig. 2 is a modification of the arrangement of Fig. 1; and Fig. 3 illustrates several characteristic curves which will be employed in explaining my invention.

Referring to Fig. 1 of the drawing, the numeral 11 represents a prime mover in the form of an internal combustion engine having a throttle 12 and mechanically connected by means of a rotary shaft 13 to the rotor 14 of a dynamometer 15, for example, of the inductor eddy current type. Connected also to the shaft 13 or arranged to be driven at a speed proportional thereto are the rotors or armatures 16 and 17 of a pair of direct current exciter generators 18 and 19. The dynamometer 15 is provided with a field winding 20 which is adapted to be excited from the armature 17 of the exciter generator 19 through a three position double-pole switch 21 and controlled by a pair of rheostats 22 and 23, the rheostat 22 being the main control member and the rheostat 23 being a vernier element. By throwing the switch 21 to the right, the dynamometer field 20 may be connected to a constant voltage source of supply 24. The rheostats 22 and 23, under either condition of operation, serve to control the actu 1 amount of load or excitation where manual control is employed to obtain the exact load setting. The exciter generator 19 is preferably designed to operate on the straight portion of its saturation curve.

When the switch 21 is in the intermediate position as illustrated in the drawing, the dynamometer field 20 is excited from a plurality of series-connected independent voltage sources, one being the armature 17 of the exciter 19 and the other the constant voltage source 24. A potentiometer type rheostat 24a having an adjustable contact 24b provides means for deriving adjustable amounts of the constant voltage component.

The exciter generator 19 is provided with the usual field winding 25 which is shown connected to the armature 16 of the smaller pilot exciter generator 18 through a potentiometer type rheostat 26 and a vernier rheostat 27. The potentiometer 26 is connected to the constant voltage source of supply 24 and is arranged so that the voltage across it adds to that of the armature 16 of the pilot exciter 18. By means of an adjustable contact 28 different values of voltage may be derived from the potentiometer 26.

The exciter generator 18 is provided with a field winding 29 which is supplied with direct current from the separate source 24. A suitable arrangement such as a rheostat 30 provides means for supplying the field 29 with any desired uniform excitation. By means of a switch 31 the field winding 29 may be disconnected from the source of supply 24.

The dynamometer 15 may be provided with the customary scale beam to form a conventional cradle type dynamometer. It will also be appreciated that other types of dynamometers may be employed in carrying out the principles of my invention together with other means of measuring the power absorbed.

The arrangement of Fig. 2 is disclosed in a divisional application, Serial No. 474,479, filed February 2, 1943, and assigned to the assignee of this application and is quite similar to that of Fig. 1 but has several points of distinction. One point of distinction resides in the insertion of an amplifier 34 between the armature 17 of the exciter 19 and the field winding 20 of the dynamometer. In the illustrated embodiment I have shown an amplifier of the dynamoelectric type comprising a conventional direct current generator which is preferably designed to operate on the straight portion of its saturation curve and which includes an armature 35 and a field winding 36. The amplifier 34 also comprises a suitable constant speed motor 37 preferably of the synchronous or induction type for driving the armature 35. Since the direct current generator is operated in the unsaturated condition and has its armature 35 driven at a constant speed, it delivers a voltage to the dynamometer field 20 which is proportional to the excitation which is supplied to its field or input circuit 36. This generator may be replaced by a direct current machine of the armature-reaction excited type, such for example as that disclosed and claimed in Patent No. 2,227,992, E. F. W. Alexanderson and M. A. Edwards, granted January 7, 1941, and which is assigned to the assignee of the present invention. Furthermore, an electronic amplifier may be employed in lieu of the dynamoelectric type, if desired.

As indicated previously, the pilot exciters 18 and 19 of the foregoing arrangement may or may not be cradled with the dynamometer depending upon the required size of the exciter generator. When these pilot exciter generators are of such small size in comparison to the size of the dynamometer that the torque required to drive them is negligible these units need not be cradled. Hence, by the employment of an amplifier such as 34 for the output of exciter 19, small pilot exciters may be used and thereby avoid the expense and inconvenience of mounting the exciter generators in a manner to ascertain their load requirements.

Another point of difference in the arrangement of Fig. 2 over that of Fig. 1 resides in the substitution of a potentiometer type rheostat 38 for the series rheostat 22 in the dynamometer field circuit. Also, the field producing means of the main exciter 19 comprises a pair of field windings 25a and 25b which are adapted to produce magnetic fluxes in the same relative direction. The field winding 25a is adapted to be connected to the constant voltage source of supply 24 through the potentiometer 26, so that an adjustable voltage component of excitation may be provided. The field winding 25b is connected to the armature 16 of the pilot exciter generator 18 through a switch 42 for deriving a voltage component of excitation which is variable with the speed. The arrangement of Fig. 2 differs further from that of Fig. 1 in that the field winding 29 of the smaller pilot exciter generator 18 is shown connected to the source of supply 24 through a potentiometer type rheostat 41 and a vernier element 40. With this latter arrangement the voltage applied to field winding 29 readily may be reduced to zero without interrupting the circuit as in Fig. 1.

In the arrangement of Fig. 2 the dynamometer field producing means comprises an auxiliary field winding 20a in addition to the winding 20. These windings are connected to produce magnetic fluxes in the dynamometer which are in the same relative direction. The field winding 20a is connected to the constant voltage source 24 through the potentiometer 24a for supplying the constant component of excitation when the dynamometer excitation is being obtained from two independent voltage sources. It will be appreciated, however, that the arrangements of Figs. 1 and 2 may be used alternatively so far as this feature is concerned.

In operation, assume that the switch 21 is thrown to the left position to connect the armature 17 of the exciter 19 in circuit with the field winding 20 and the rheostat 22 and 23 of Fig. 1, or in circuit with the input winding 36 and the potentiometer 38 of Fig. 2. The first exciter 18 receives its excitation from the constant direct current source 24 and this excitation may be adjusted by the series rheostat 30 of Fig. 1 or the rheostats 41 and 40 of Fig. 2. The second exciter generator 19 receives its excitation from the armature 16 of the first exciter 18 and from the constant voltage source of supply 24 through the potentiometer 26. The excitation component delivered to the exciter 19 from the exciter 18 increases proportionally to the speed of the exciter 18 since the latter has constant excitation applied to its field. The component of excitation supplied to the winding 25 or to the winding 25a from the potentiometer 26, however, is independent of the speed.

Since exciter generator 19 is also driven at a speed proportional to that of the dynamometer, the armature voltage delivered by this exciter generator would normally be increased directly in proportion to the speed with only constant excitation applied to its field from the potentiometer 26, but inasmuch as the excitation supplied from the exciter 18 is increasing in accordance with the speed, the voltage output at the armature 17 of the exciter generator increases more rapidly. It will be seen that the exciter generator 19 has a component of voltage in its armature circuit which varies directly as the speed due to the excitation supplied from the potentiometer 26, and if the exciter 19, as in the instant case, is designed so that it operates in the unsaturated condition or on the straight portion of its saturation curve the output voltage component due to the excitation received from the exciter generator 18 will then increase approximately as the square of the dynamometer and exciter generator speed. This follows from the fact that the generated voltage in the armature 17 is a function of the product of its speed and field excitation, so that the linear component of excitation injected by exciter generator 18 appears at the armature of exciter generator 19 as a voltage which varies as the square of the speed. As indicated heretofore, in the apparatus disclosed in Fig. 1, this armature voltage is applied to the field 20 of the dynamometer directly through the rheostat 22 and 23, while in the apparatus illustrated in Fig. 2, the voltage from the exciter 19 is connected to the input circuit of the linear response amplifier 34, the output of the amplifier being connected to the dynamometer field 20.

In order more fully to explain the operation and manner of adjustment of the system, Fig. 3 has been presented to show typical curves of the excitation supplied to the field winding 20 obtained with my improved excitation system. These curves have been drawn to show the general relationships obtainable between the dynamometer excitation and the speed. The curve OA represents the dynamometer excitation characteristic which is obtained by the use of only the constant voltage component of excitation supplied to the field of the exciter 19. In the arrangement of Fig. 1 this may be accomplished by opening the switch 31 to disconnect the field winding 29 from the source of supply 24. While in the arrangement of Fig. 2, the voltage supplied to the field winding 29 may be reduced to zero by adjusting the adjustable contact of the potentiometer 41. For such a condition of operation the excitation of the dynamometer is caused to vary linearly with the speed thereby producing a corresponding change in the dynamometer torque. The rate of rise of excitation with speed may be controlled by the potentiometer contact 28. The curve OB represents the type of excitation characteristic obtainable without any fixed component of excitation applied to the field of the exciter 19. In both of the arrangements of Figs. 1 and 2, this may be accomplished by adjusting the movable contact 28 of the potentiometer 26 so that the voltage obtained from the source of supply 24 is zero. In this case the dynamometer excitation is varied in accordance with the square of the speed to produce corresponding changes in the dynamometer torque. The characteristic OC represents the combined excitation characteristic obtainable when both of the excitation sources for the field winding 25 are in operation. It is clear that, with the field adjusting elements of the exciter generators 18 and 19 set to a given position, the magnitude of the excitation current supplied to the dynamometer field 20 may be adjusted by means of the rheostats 22 and 23 of Fig. 1 and the potentiometer 38 and the vernier rheostat 23 of Fig. 2. By proper adjustment of the exciter field control elements, the relative magnitudes or proportions of the two excitation components supplied to the dynamometer for a given speed or speeds may be altered as desired to impose horsepower loads on the engine which vary automatically as a function of speed in the desired manner. For example, by increasing the resistance in rheostat 30 of Fig. 1, or by moving the contact arm of potentiometer 41 of Fig. 2 to the left, to reduce the voltage applied to the field 29 of exciter 18, the rate of rise or the magnitude of the voltage component for exciting the dynamometer field which varies as the square of the speed is reduced. By moving the arm 28 of the potentiometer 26 to the left, the magnitude of the dynamometer excitation voltage component which varies as the first power of the speed is reduced. The ease with which the overall characteristic curve can be altered by the simple adjustment of two rheostats is a most valuable feature.

In describing the operation of the arrangement of Figs. 1 and 2, the switch 21 was assumed to be thrown to the left to connect the dynamometer field 20 with the armature 17 of exciter 19 for automatic operation. At times it may be desirable to use manual control and eliminate the effect of the automatic excitation completely, that is, to secure excitation for the dynamometer which is independent of speed changes. For such operation the switch 21 is thrown to the right to connect the exciting field winding 20 of the dynamometer in Fig. 1, or the input circuit 36 of the amplifier in Fig. 2, to the constant voltage direct current source of supply 24 and in this way the system operates with conventional constant excitation which can be adjusted by rheostats 22 and 23 of Fig. 1, or by the potentiometer and vernier of Fig. 2, to obtain the desired load. In the arrangement of Fig. 2, all or a portion of this constant excitation may also be provided by means of the field winding 20a.

When it is desired to operate the system by supplying a constant component of excitation to the dynamometer in conjunction with the component or components which are functionally related to the speed, the switch 21 of Fig. 1 is maintained in the intermediate position to connect the armature 17 in series additive relation with the constant voltage source 24. For this same condition of operation, in the system of Fig. 2, the switch 21 is thrown to the left and the constant component of excitation is supplied to the field winding 20a through the rheostat 24a in such a manner that both voltages cause magnetic fluxes to be produced in the dynamometer in the same relative direction. This connection also serves the additional purpose of permitting maximum excitation at any speed down to zero on the dynamometer thereby permitting maximum available torque to be obtained on the dynamometer even at low speeds.

I have thus provided an improved excitation system which is capable of delivering a voltage which is independent of speed for exciting the dynamometer field. I have also provided an arrangement whereby the dynamometer excitation may be varied directly as the speed thereby producing a modified shape in the horsepower-speed characteristic of the dynamometer. Further, I may obtain a dynamometer excitation characteristic which is approximately proportional to the square of the speed in order to produce a change in the horsepower-speed characteristic such that the horsepower absorption increases at a faster rate with respect to speed. Also, by combining in additive relation the excitation component for the main exciter generator 19 which is independent of the speed with the component of excitation which varies with the speed, the total excitation supplied to the dynamometer may be made automatically to vary in accordance with the first power of the speed and over a range including the second power with the result that the horsepower absorption of the dynamometer as a function of speed may be made to assume intermediate values.

I have also provided means whereby a constant component of excitation may be supplied simultaneously to the dynamometer with the component or components which are functionally related to the speed. This latter arrangement contributes toward still greater flexibility in the operation from the standpoint of making it possible to produce additional changes in the shape or slope of the total dynamometer excitation characteristic. It also renders it possible to obtain maximum excitation on the dynamometer at low speeds with relatively small exciters, and at the same time is effective to provide a stabilizing action to prevent hunting or overspeeding by producing a pronounced increase in the dynamometer torque with increases in speed in those cases where the dynamometer would have a flat or nearly uniform speed-torque characteristic over a large part of its speed range if the excitation were held at a constant value.

The apparatus is thus adapted for producing in the laboratory various torque-speed and horsepower-speed relationships for simulating different types of loads so that operating characteristics similar to that found in actual practice from the standpoint of stability and control may be obtained. The apparatus is particularly useful in those cases where the excitation and torque of the dynamometer are not related in a simple manner. In other words, in order to obtain an absorption torque, for example, which varies as the square of the speed, it may be necessary to increase the field excitation at a different rate. Also, due to differences in various machine designs, this rate or the relative curvature of the total required dynamometer excitation curve changes for different machines. This difference in excitation rate is readily obtainable by changing the proportions or relative magnitudes of the various excitation components.

In accordance with the provisions of the patent statutes, I have described the principle of operation of my invention together with the apparatus which I now consider to represent the best embodiment thereof but I desire to have it understood that the apparatus shown is merely illustrative and that the invention may be carried out by other means.

What I claim as new and desire to secure by Letters Patent of the United States is:

1. In combination in a system for testing prime movers, an electric dynamometer comprising a field exciting winding and a rotary element adapted to be coupled to the prime mover to be tested for placing a load of controllable speed-horsepower characteristics on said prime mover, a direct current generator having a field exciting winding and an armature driven at a speed proportional to the dynamometer, means for exciting said dynamometer field exciting winding in proportion to the armature voltage variations of said generator, and a plurality of independent voltage sources for exciting the field exciting winding of said generator, the voltage obtained from one of said voltage sources being variable in accordance with the speed of said dynamometer, the voltage obtained from the other of said voltage sources being independent of speed.

2. In combination in a device for testing prime movers, an electric dynamometer including a rotary element adapted to be mechanically connected to the prime mover to be tested, said dynamometer also including means for controlling its speed-torque characteristics, a generator having a field exciting winding and an armature driven at a speed proportional to the dynamometer, means connecting said dynamometer control means for energization in accordance with the armature voltage variations of said generator, a plurality of independent voltage sources, means for exciting the field exciting winding of said generator from said voltage sources, the voltage obtained from one of said voltage sources being variable in acordance with the speed of said dynamometer, and means for varying the ratio of the voltages derived from said voltage sources corresponding to a given speed.

3. In combination in a testing device, an electric dynamometer including a rotary element and an operating winding for controlling the absorption capacity of said dynamometer, said rotary element being adapted to be driven by a mechanical power producing member to be tested, a generator having a field winding and an armature member driven at a speed proportional to the dynamometer, and means comprising a plurality of independent voltage sources connected in series relation with each other for supplying current to the field winding of said generator and the magnitude of a component of field current from one of said voltage sources varying with the speed of said dynamometer, and means for energizing the operating winding of said dynamometer in proportion to the voltage variations in the armature of said generator.

4. In combination in a testing device, an electric dynamometer including a rotary element and an operating winding for controlling the absorption capacity of said dynamometer, said rotary element being adapted to be driven by a power producing member to be tested, a generator having a field winding and an armature element driven at a speed proportional to the dynamometer, means electrically connecting the operating winding of said dynamometer to be energized in accordance with voltage variations in the armature of said generator, means comprising a plurality of independent voltage sources connected in series relation with each other for supplying current to the field winding of said generator, one of said voltage sources producing a voltage which varies in accordance with the speed of said dynamometer and the voltage derived from said other voltage source being adjustable in magnitude, whereby the torque of said dynamometer may be made to vary in proportion to values exceeding the first power of said speed variations.

5. In combination in a system for testing prime movers, an electric dynamometer having controllable speed-torque characteristics and comprising a rotary member and a field winding, said rotary member being adapted to be driven by the prime mover to be tested, an exciter generator comprising an armature and field producing means, said armature being driven at a speed proportional to the speed of the rotary member of said dynamometer, means for exciting the field winding of said dynamometer in accordance with the voltage variations in the armature of said exciter generator, a second exciter generator comprising an armature and magnetic field producing means, the armature of said second exciter generator being driven at a speed proportional to the speed of the rotary member of said dynamometer, and means connecting the armature of said second exciter generator and a source of substantially constant voltage in the circuit of said first exciter generator field producing means to supply excitation to said first generator having a component which is variable with the speed of said dynamometer for changing automatically the torque absorbing capacity of said dynamometer in accordance with variations in speed, the voltage derived from said constant voltage source being adjustable in magnitude for changing that component of exciter excitation which is independent of the speed.

6. In combination, an electric dynamometer for placing a load of controllable speed-torque characteristics on a mechanical power source, said dynamometer including a rotary element adapted to be connected to said mechanical power source, said dynamometer also including a field winding, a first exciter generator driven at a speed proportional to said dynamometer, said first exciter generator comprising an armature and a field winding, means connecting the armature of said first exciter generator for exciting said dynamometer field winding, a second exciter generator having a field winding and an armature member driven at a speed proportional to said dynamometer, a substantially constant voltage source of supply, means for deriving adjustable amounts of voltage from said constant voltage source of supply, means connecting the voltage derived from said adjustable means in series additive relation with the voltage produced in the armature of said second exciter generator for exciting the field of said first exciter generator, and means for varying the exciting current supplied to said second exciter generator field winding, said last named means and said adjustable means providing means for changing the relative magnitudes of said series connected voltages corresponding to a given speed.

7. In combination, in a testing system, an electric dynamometer for placing a load of controllable speed-torque characteristics on a mechanical power source, said dynamometer comprising a rotary element adapted to be connected to said power source, said dynamometer also including a field winding, a first exciter generator having an armature driven at a speed proportional to said dynamometer, a field winding for said first exciter generator, a second exciter generator having a field winding and an armature member driven at a speed proportional to said dynamometer, means for exciting the field winding of said second exciter generator, a substantially constant voltage source of supply, a potentiometer including a movable element for deriving adjustable values of voltage from said source of supply, and means connecting the armature of said second exciter generator in series circuit relation with said potentiometer including said movable element for supplying excitation to said first exciter generator field winding, the armature of said second exciter generator being adapted to generate a component of voltage which varies linearly with the speed, said adjustable component of voltage being adjustable over a range starting from zero and said variable component being adjustable over a range starting from substantially zero for a given speed whereby the slope of the dynamometer excitation curve may be changed from a value which varies directly as the speed to a value which varies substantially as the square of the speed.

8. In combination in a device for testing prime movers, an electric dynamometer for loading the prime mover to be tested, said dynamometer having a field winding for controlling the speed-torque characteristics thereof, a first exciter generator having field control means and an armature member driven at a speed proportional to the dynamometer, means for energizing the field winding of said dynamometer in accordance with the voltage variations in the armature of said first exciter generator, a second exciter generator having a field winding and an armature member driven at a speed proportional to the dynamometer, a substantially constant voltage source of supply, means for deriving voltages of adjustable magnitude from said source of supply, means connecting the armature of said second exciter generator in series relation with the adjustable voltages derived from said constant voltage source for energizing the field producing means of said first exciter generator, whereby the field producing means of said first exciter generator may be energized in accordance with a component of voltage which varies in accordance with the speed of said dynamometer, variable means for exciting the field winding of said second exciter generator, and means for selectively connecting either the armature of said first exciter generator or said constant voltage source of supply to energize the field winding of said dynamometer, whereby the excitation of said dynamometer may be made to assume a plurality of intermedate values which vary as a function of speed between the limits of the first and the second power of the speed or whereby said excitation may be made independent of speed.

9. In combination in a system for testing prime movers, an electric dynamometer comprising a field exciting winding and a rotary element adapted to be coupled to the prime mover to be tested for placing a load of controllable speed-torque, a direct current generator having a field exciting winding and an armature driven at a speed proportional to the dynamometer, a substantially constant voltage source of supply, means for exciting said dynamometer field exciting winding in accordance with voltage components derived from the armature of said generator and said constant voltage source of supply, and a plurality of independent voltage sources for exciting the field exciting winding of said generator, the voltage obtained from one of said voltage sources being variable in accordance with the speed of said dynamometer, and the voltage obtained from the other of said voltage sources being independent of speed.

10. In combination in a testing device, an electric dynamometer including a rotary element and an operating winding for controlling the absorption capacity of said dynamometer, said rotary element being adapted to be driven by a power producing member to be tested, a generator having a field exciting winding and an armature element driven at a speed proportional to the dynamometer, a plurality of independent voltage sources connected in series relation with each other for controlling the energization of said dynamometer operating winding, one of said voltage sources comprising the armature of said generator and the other of said voltage sources being independent of speed variations of said dynamometer, and a plurality of voltage sources for exciting said field exciting winding of said generator, the voltage obtained from one of said voltage sources being variable in accordance with the speed of said dynamometer, and the other of said voltage sources being independent of said speed.

11. In combination in a system for testing prime movers, an electric dynamometer comprising a field exciting winding and a rotary element adapted to be coupled to the prime mover to be tested for placing a load of controllable speed-torque characteristics on said prime mover, a direct current generator having a field exciting winding and an armature driven at a speed proportional to the dynamometer, a supply voltage independent of the speed of said dynamometer, means for energizing said dynamometer field exciting winding in accordance with voltages obtained from the armature of said direct current generator and said independent supply voltage and in a manner whereby said voltages cause said field exciting winding to produce magnetic fluxes in the same direction, and means for energizing said generator field exciting winding in accordance with voltages one of which varies in accordance with the speed of said dynamometer, and the other of which is obtainable from said independent supply source, said last-mentioned voltages being arranged to cause said field exciting winding to produce magnetic fluxes in said generator in the same relative direction.

RICHARD H. KAUFMANN.